United States Patent
Cohen et al.

(10) Patent No.: US 9,649,594 B2
(45) Date of Patent: May 16, 2017

(54) DUAL INJECTION GRID ARRANGEMENT

(71) Applicant: ALSTOM Technology Ltd, Baden (CH)

(72) Inventors: Mitchell B. Cohen, West Hartford, CT (US); Todd D. Hellewell, Windsor, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 19 days.

(21) Appl. No.: 14/670,850

(22) Filed: Mar. 27, 2015

(65) Prior Publication Data

US 2016/0279565 A1    Sep. 29, 2016

(51) Int. Cl.
*B01D 53/50*    (2006.01)
*B01D 53/56*    (2006.01)
(Continued)

(52) U.S. Cl.
CPC .......... *B01D 53/74* (2013.01); *B01D 53/346* (2013.01); *B01D 53/60* (2013.01); *B01D 53/76* (2013.01);
(Continued)

(58) Field of Classification Search
CPC ...... B01D 53/50; B01D 53/501; B01D 53/56; B01D 53/77; B01D 53/78; B01D 53/79;
(Continued)

(56) References Cited

U.S. PATENT DOCUMENTS 1,433,255 A * 10/1922 Binks ........................ B05B 7/12
                                                                 239/402.5
4,115,515 A    9/1978 Tenner et al.
(Continued)

FOREIGN PATENT DOCUMENTS

EP    0317706 A1    5/1989
JP    4983420 B2 *  7/2012    .............. B41J 2/155

OTHER PUBLICATIONS

PCT Search Report and Written Opinion issued in connection with corresponding PCT Application No. PCT/US2016/022584 on Jun. 3, 2016.

*Primary Examiner* — Timothy Vanoy
(74) *Attorney, Agent, or Firm* — GE Global Patent Operation; Stephen G. Midgley

(57) ABSTRACT

A furnace/boiler incorporates a dual injection grid arrangement as per present disclosure. The furnace includes an enclosure having burners projecting through walls of the lower half of the enclosure. The burners inject and ignite a supply of fuel and primary air. The combustion reaction takes place in a combustion chamber. The enclosure walls carry steam generating tubes which absorb radiative heat from the combustion flame to produce steam. The heat is also utilized by radiative/convective super-heater and reheater elements where steam flowing through the radiative/convective super-heater and reheater elements is superheated by the hot gas products of the combustion process. The hot gas combustion products are referred to as the exhaust or flue gas. The combustion products exit the combustion chamber at boiler nose and enter in the boiler/furnace area. The present grid arrangement inject chemicals to control the creating reactants particularly NOx and $SO_3$ emissions.

12 Claims, 3 Drawing Sheets

(51) Int. Cl.

| | | |
|---|---|---|
| *B01D 53/77* | (2006.01) | |
| *B01D 53/79* | (2006.01) | |
| *B05B 7/00* | (2006.01) | |
| *B05B 7/12* | (2006.01) | |
| *B05B 9/00* | (2006.01) | |
| *B01D 53/74* | (2006.01) | |
| *B01D 53/76* | (2006.01) | |
| *B01D 53/34* | (2006.01) | |
| *B01D 53/60* | (2006.01) | |
| *F23J 15/00* | (2006.01) | |
| *F23J 15/02* | (2006.01) | |

(52) U.S. Cl.
CPC ............ *B01D 53/79* (2013.01); *F23J 15/003* (2013.01); *F23J 15/02* (2013.01); *B01D 2251/2062* (2013.01); *B01D 2251/2067* (2013.01); *B01D 2252/10* (2013.01); *F23J 2215/10* (2013.01); *F23J 2215/20* (2013.01)

(58) Field of Classification Search
CPC ....... B01D 53/8637; B05B 7/00; B05B 7/061; B05B 7/12; B05B 9/00
See application file for complete search history.

(56) References Cited

U.S. PATENT DOCUMENTS

| | | |
|---|---|---|
| 4,950,473 A | 8/1990 | Flockenhaus et al. |
| 5,342,592 A * | 8/1994 | Peter-Hoblyn ......... B01D 53/56 422/168 |
| 8,017,084 B1 | 9/2011 | Wirt et al. |
| 2005/0063887 A1* | 3/2005 | Arrol .................... B01D 53/56 423/235 |
| 2007/0180835 A1 | 8/2007 | Zauderer |
| 2009/0047199 A1* | 2/2009 | Arrol .................... B01D 53/56 423/210 |
| 2011/0002828 A1* | 1/2011 | Ukai .................... B01D 53/501 423/239.1 |
| 2015/0064083 A1 | 3/2015 | Cohen et al. |

* cited by examiner

DUAL INJECTION GRID ARRANGEMENT

TECHNICAL FIELD

The present disclosure relates to a dual injection grid arrangement for injection of chemicals and more particularly a dual injection grid arrangement for simultaneous control of NOx and $SO_3$ emissions in coal, oil or gas fired furnace/boiler to reduce pollutants in the furnace/boiler flue gases.

BACKGROUND

Boilers for electric power generation often have combustion systems with furnaces that are fired with solid fuel, such as bituminous coal, lignite, biomass, etc.; these combustion systems are usually provided with mills and ducting for supplying the pulverized fuel to one or more burners. Generally, during the combustion process of fossil fuels pollutants such as nitrogen oxides (NOx) and sulfur oxides ($SO_2$ and $SO_3$) are generated. If allowed to enter the atmosphere, these pollutants can detrimentally impact the environment and pose health hazards to humans and animals. U.S. Pat. No. 8,017,084 discloses an ammonia injection grid for a selective catalytic reduction (SCR) system that provides uniform distribution of ammonia to the SCR catalyst in NOx reduction systems for heat recovery steam generation systems, packaged boilers, simple cycle catalyst systems, utility boilers and fired heaters for superior operational efficiency. The ammonia injection grid includes an injection tube nozzle for injecting ammonia into a flow of flue gas. The ammonia injection grid also includes a corrugated turbulence enhancer associated with the injection tube to generate turbulent wake to enhance turbulent mixing.

State-of-the-art grid arrangements have two independent injection grids for reducing NOx and controlling $SO_3$ emissions. These grid arrangements having separate grids imply a large consumption of chemicals as such chemicals are distributed separately in the furnace/boiler and thus large cost associated with the chemicals. Further such independent grid arrangements take a lot more space along with separate auxiliaries for each grid which leads to a more complex working arrangement with high capital cost of multi-additive systems with multiple control systems. Each grid arrangement is controlled separately to supply chemicals for reducing NOx and controlling $SO_3$ emissions leading to a more complex arrangement with multiple controls.

Consequently, there is need to provide a grid arrangement which is simple in operation, easy in installation, less expensive in capital cost and more effective in reducing NOx and controlling $SO_3$ emissions at various locations in the furnace/boiler.

SUMMARY

The present disclosure describes a dual injection grid arrangement and a method for injection of chemicals for reducing pollutants in the flue gas from a furnace due to combustion of fuels. This will be presented in the following simplified summary to provide a basic understanding of one or more aspects of the disclosure including all advantages. The sole purpose of this summary is to present some concepts of the disclosure, its aspects and advantages in a simplified form as a prelude to the more detailed description that is presented hereinafter.

An object of the present disclosure is to propose a dual injection grid arrangement for simultaneous control of NOx and $SO_3$ emissions in coal, oil or gas fired furnace/boilers to reduce pollutants in the furnace/boiler flue gases which can be used in existing and in new unit installations to significantly reduce the emission of these pollutants.

The present invention offers a technical solution of co-injection of chemicals, for example, a mixture of ammonia or urea with an aqueous alkali or alkaline sorbent such as sodium carbonate, sodium bicarbonate or calcium hydroxide from a dual injection grid arrangement having multiple injection points.

By adopting this means it is possible to inject chemicals from one grid to control simultaneously NOx and $SO_3$ emissions at the same time and location. Various other objects and features of the present disclosure will be apparent from the following detailed description and claims.

According to one aspect disclosed herein, there is provided a dual injection grid arrangement comprising at least one injection tube having at least one nozzle for injecting chemicals into a flow of flue gas. Further, the injection tube extends generally transverse or axial to the flow of the flue gas, wherein the nozzle of the injection tube is an atomizing nozzle that injects chemicals in the flue gas in either a square or conical spray pattern. The injection tube is having an inner shell which is surrounded by an outer shell.

In another aspect the injection from the dual injection grid arrangement can be a mixture of liquid/gas phase or liquid/liquid phase or gas/gas phase. Further, the chemicals injected comprising a mixture of ammonia or urea with an aqueous alkali or alkaline sorbent such as sodium carbonate, sodium bicarbonate or calcium hydroxide. The present dual injection grid arrangement provides an advantage that the various combinations of gas and liquid phase can be injected together from the one grid for controlling the NOx and $SO_3$ emissions in the flow of the flue gas.

In yet another aspect, the nozzle may be attached on the inner shell of the injecting tube to inject a liquid alkali or alkaline sorbent or mixture of alkali or alkaline sorbent with or without aqueous ammonia into the flow of flue gas. Further on the outer shell numerous nozzles in the form of extension arms with at least one nozzle cap may be attached in a staggered arrangement to inject gaseous ammonia diluted with air into the flow of flue gas for reducing the NOx emissions. The present dual injection grid arrangement provides an advantage that the chemicals for controlling the NOx and $SO_3$ emissions are injected together from the atomized nozzle attached to the single grid at the same time and same location into the flow of the flue gas.

In yet another aspect, a plurality of pores may be formed in a staggered arrangement on the outer shell to provide cool air into the flow of flue gas. At the same time, through an inner shell a liquid injection in the form of a mixture of ammonia or urea with an aqueous alkali or alkaline sorbent such as sodium carbonate, sodium bicarbonate or calcium hydroxide may be supplied from the atomized nozzles attached to the single grid at the same time and same location into the flow of the flue gas to control the NOx and $SO_3$ emissions. The present dual injection grid arrangement provides the advantage of direct liquid injection from a single grid at the same time and same location into the flow of the flue gas.

In yet another aspect, a controller for NOx and a controller for $SO_3$ are provided to control the flow of the chemicals through the dual injection grid arrangement. The controllers, located on a separate skid, provide chemicals at the same time and location to control the $SO_3$ emissions and the NOx emissions in the flue gas through the dual injection grid arrangement. The injection of the chemicals covers the full cross-sectional area of duct, eliminating the need for additional flue gas mixing devices, either upstream or downstream of the dual injection grid arrangement location. The advantage is that controllers ensure that the right quantity of chemicals in controlling the NOx and $SO_3$ emissions are provided at the right time and location. There are multiple atomized nozzles that are provided in the dual medium grid to cover the full cross-sectional area of the duct. This provides uniform distribution based on the required amount of chemical to control the NOx and $SO_3$ emissions at the same location.

The present disclosure also refers to a method of reducing pollutants in the flue gas from a furnace, comprising of a dual injection grid arrangement with at least one injection tube having at least one nozzle, providing chemicals for reducing pollutants in the flue gas, supplying the chemicals to the dual injection grid arrangement, injecting the chemicals in the flue gas in either a square or conical spray pattern through the at least one nozzle, wherein at least one nozzle is an atomized nozzle.

In another aspect, supplying of chemicals includes the supplying of a mixture of ammonia or urea with an aqueous alkali or alkaline sorbent to an inner shell and an outer shell of the injection tube. The injection of the chemicals includes injecting a liquid alkali or alkaline based sorbent with or without ammonia and water into the flue gas through a nozzle which is attached to the inner shell. Further, injecting gaseous ammonia with dilution air into the flue gas through at least one extension arm is furnished with at least one nozzle cap, which is attached in a staggered arrangement to the outer shell.

In another aspect, controlling flow of the chemicals through the dual injection grid arrangement through an controller for NOx and controller for $SO_3$, providing the chemicals at the same time and location to control the $SO_3$ and the NOx emissions in the flue gas. The injection of the chemicals covering the full cross-sectional area of a duct through the injection eliminates the need for additional flue gas mixing devices either upstream or downstream of the injection grid arrangement location.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawings, wherein like elements are identified with like symbols, and in which:

DETAILED DESCRIPTION OF THE PRESENT DISCLOSURE

Figure 1:
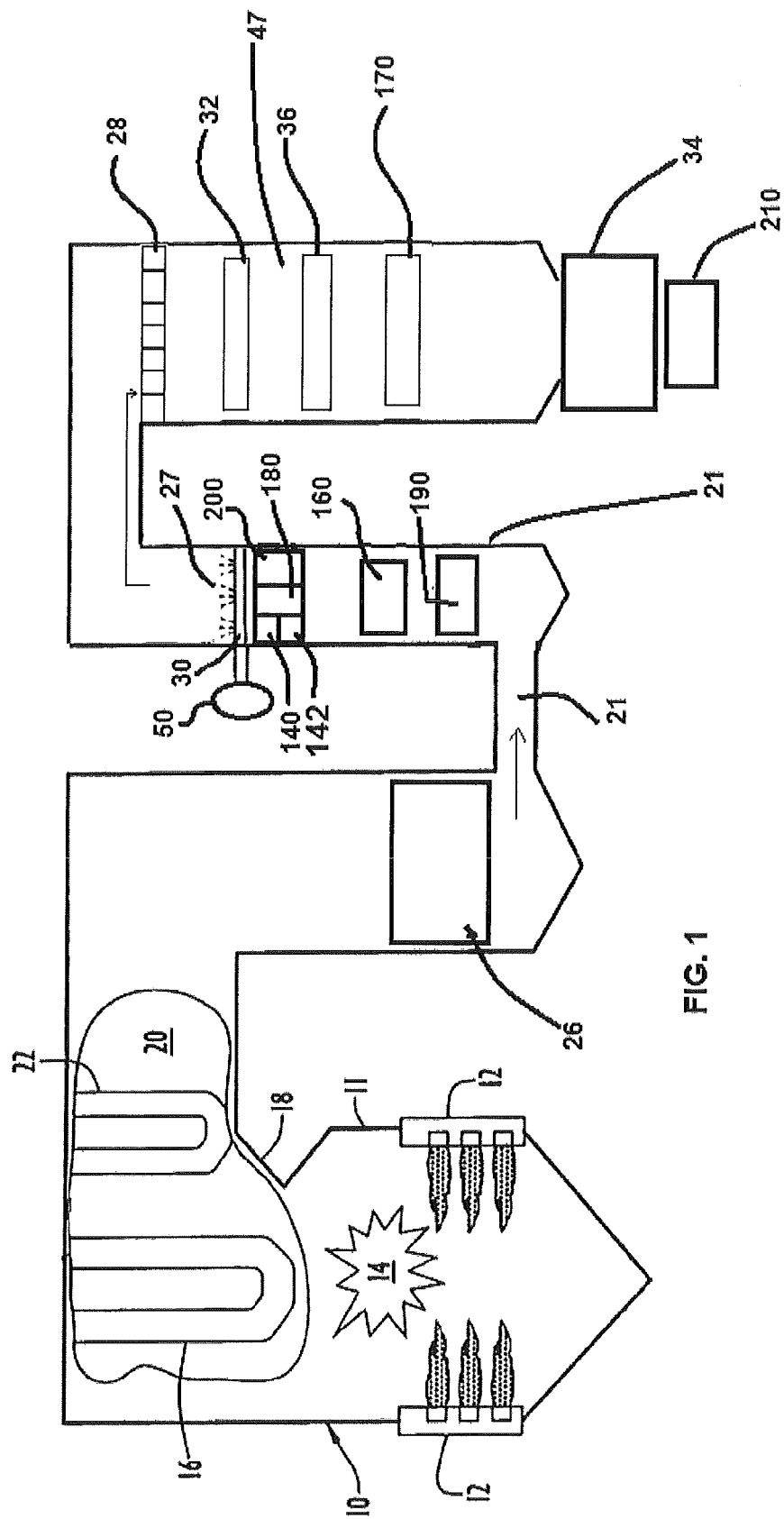
FIG. 1 is a schematic representation of the side view of a furnace with an installed dual grid arrangement in accordance with an exemplary embodiment of the present disclosure.

FIG. 1 shows schematically a furnace/boiler 10 which incorporates a dual injection grid arrangement 27 as per present disclosure. The furnace includes an enclosure 11 having burners 12 projecting through walls of the lower half of the enclosure 11. The burners 12 inject and ignite a supply of fuel and primary air. The combustion reaction takes place in a combustion chamber 14.

The enclosure walls carry steam generating tubes which absorb radiative heat from the combustion flame to produce steam. The heat is also utilized by radiative/convective super-heater elements where steam flowing through the radiative/convective superheater elements is superheated by the hot gas products of the combustion process. The various superheater elements and heat exchanger tubes in the furnace 10 are referred to generally as heat exchangers herein. The hot gas combustion products are referred to as the exhaust or flue gas. The combustion products exit the combustion chamber 14 at boiler nose 18 and enter the boiler/furnace convective area 20. The convective area of the boiler/furnace 20 has a number of tube banks of radiant and convective heat surfaces 16 and 22. The flue gas passes through economizer banks 26 which are for preheating boiler feed water. The flue gas then passes up through a vertical duct 21 and then through a flow straightener 28 to straighten the flow of flue gas which leads to catalyst layers 32 and 36. The flue gas passes through an air preheater 34 for preheating the primary and secondary combustion air. Past the air preheater 34, the flue gas enters gas cleaning equipment, e.g., a particulate cleaning device (not shown) and a dry or wet scrubber (not shown). The cleaned gas is then exhausted to the atmosphere through a stack (not shown).

The dual injection grid arrangement 27 is installed within the duct 21 to extend across the full cross-sectional area of the duct 21. The exact position of the dual injection grid arrangement 27 within a particular duct is unit specific. The dual injection grid arrangement 27 may be installed in a vertical or horizontal plane in the duct 21. Further, the dual injection grid arrangement 27 has at least one injection tube 30 to inject chemicals into a flow of fuel gas. The injection tubes 30 extend generally transverse or axial to the flow of flue gas in the duct 21.

The injection tube 30 has a plurality of apertures such as nozzles 40 or drilled holes spaced at intervals along the injection tube 30, with each nozzle 40 ejecting a mixture of pollutant reducing chemicals into the duct 21. The number of injection tubes per grid and the pitch of the nozzles is unit specific and are dependent on furnace/boiler 10 geometry, fuel properties, and furnace/boiler 10 flue gas flow properties and emission requirements. The multiple nozzles on the injection tube 30 cover the width and depth of the duct 21 to ensure the proper uniform distribution of the chemicals into the duct 21. The nozzle 40 may be an atomized nozzle that injects the chemicals in a pattern, for example, either in a square or conical spray pattern. The chemicals are injected in a mixture of liquid/gas phase or liquid/liquid phase or gas/gas phase. Further, the chemicals are injected comprising a mixture of ammonia or urea with an aqueous alkali or alkaline sorbent, for example, such as sodium carbonate, sodium bicarbonate or calcium hydroxide. Many similar reagents which are capable of reducing NOx and SO₃ concentration may also be considered.

Within the dual injection grid arrangement 27, there will be regions of relatively high temperature, mass flow and NOx concentration, which would require a high input of ammonia and regions of relatively low NOx concentrations, but high SO₃ concentrations, which would require high input of sodium carbonate, sodium bicarbonate or calcium hydroxide. Therefore, in accordance with the present disclosure, the chemicals are injected in such a way that the concentrations thereof can be varied over a selected volume according to variations in the concentrations of the chemical species to be treated.

The ammonia and the aqueous alkali or alkaline sorbent may either be premixed before entry into the injection tube 30 or mixed only at the point of injection or separately injected into the duct 21. A manifold 50, shown in FIG. 1, is provided to premix the ammonia both in liquid and gaseous state and the aqueous alkali or alkaline sorbent. In case of mixing only at the point of injection, or separately injecting into the duct 21, separate manifolds can be arranged.

Figure 2A:
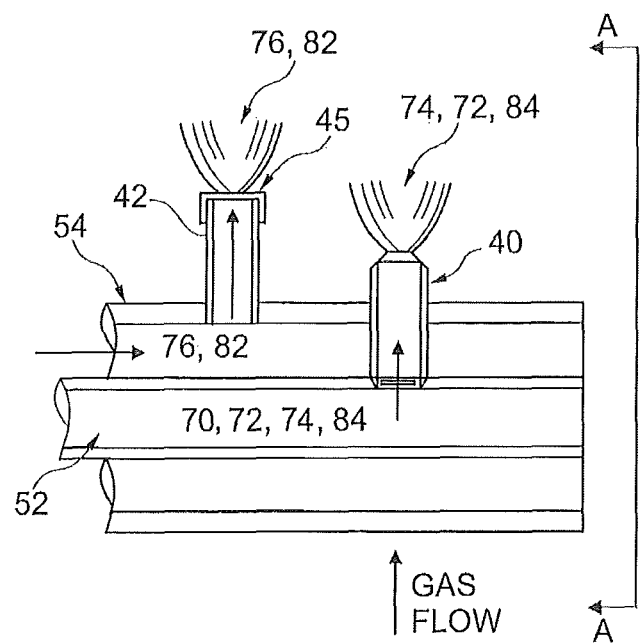
FIG. 2A is a side view of a first embodiment of an injection tube in accordance with the present disclosure.
Figure 2B:
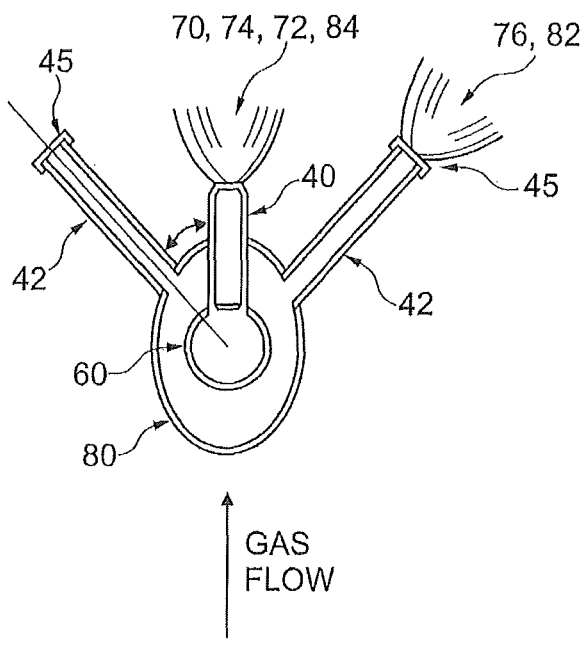
FIG. 2B is a schematic section taken along line A-A of FIG. 2A.

In an embodiment of the present disclosure, the injection tube 30 is configured with an inner shell 60, surrounded by an outer shell 80, as depicted in FIG. 2B. FIG. 2B is a schematic section taken along line A-A of FIG. 2A, depicting the chemicals for injection to the atomized nozzle 40 in the flow of the flue gas. As shown in FIG. 2A, an internal channel 52 supplies the liquid alkali 70, or alkaline sorbent 72, or mixture of alkali or alkaline sorbent 74, without ammonia to the inner shell 60, from where the atomized nozzle 40, which is attached to the inner shell 60, injects the same in the flue gas in either a square or conical spray pattern for controlling SO₃ emissions. At least one outer channel 54 supplies the gaseous ammonia 76 with diluted air to the outer shell 80 from where the nozzle, for example, in the form of an extension arm 42, is attached in a staggered arrangement to the outer shell 80, injects the same in the flue gas for reducing the NOx emissions. This injection of both the liquid alkali 70 or alkaline sorbent 72 or mixture of alkali or alkaline sorbent 74 without ammonia through atomized nozzles 40 and gaseous ammonia 76 with diluted air, may be done at same time through the extension arms 42 and at least one nozzle cap 45.

The atomized nozzle 40 attached to the inner shell 60 is placed axially with the flue gas stream. The extension arms 42 with the nozzle cap 45 attached to it is within a range of 30 degree to 60 degrees and more preferably 45 degrees offset from the flue gas flow. The extension arm 42 is between 3 inches to 9 inches more preferably 6 inches from the outer shell 80 in the duct 21 in order to avoid ash blockage of the nozzle cap 45. The nozzles 40 can be placed all along the length of the injection tube 30. The total number of nozzles, the angle at which the nozzles are placed with respect to each other and/or the spacing between the nozzles, are design parameters that will vary from application to application. The outer shell 80 is, for example, elliptical in shape, and the inner shell 60 is, for example, circular in shape. All other similar shapes can also be employed for the outer shell 80 and the inner shell 60 depending upon the specific application.

Figure 3A:
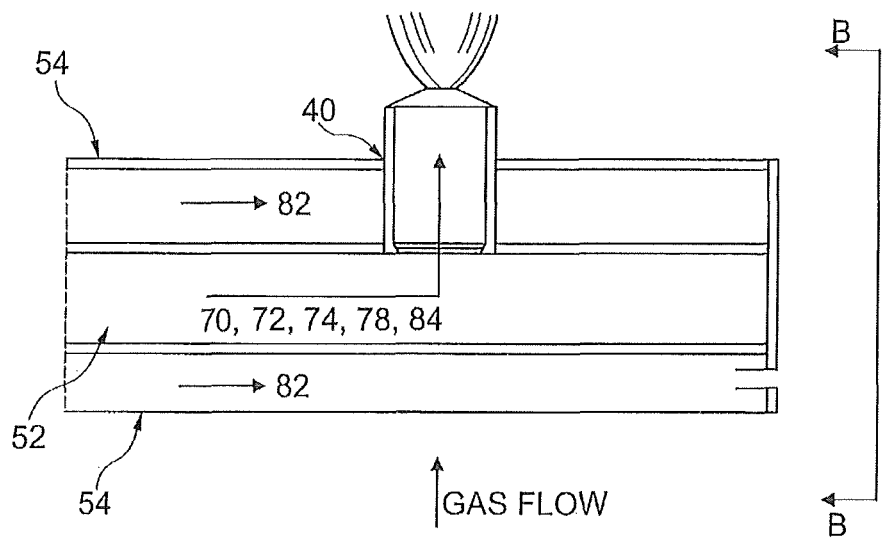
FIG. 3A a side view of a second embodiment of an injection tube in accordance with the present disclosure.
Figure 3B:
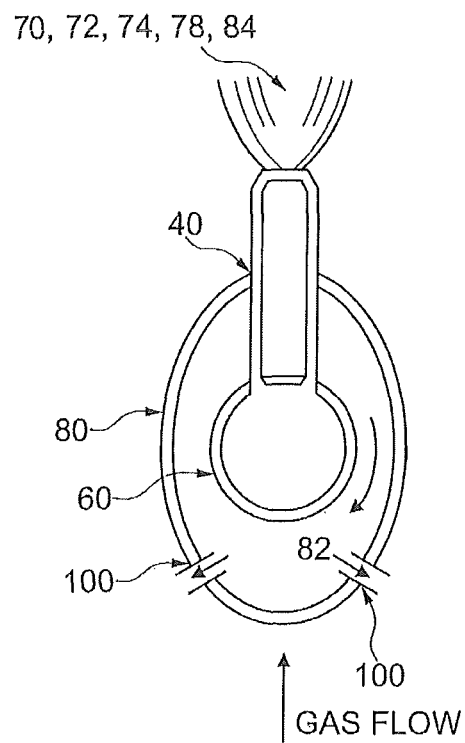
FIG. 3B is a schematic section taken along line B-B of FIG. 3A.

In another embodiment, the injection tube 30 is having the inner shell 60, which is surrounded by the outer shell 80, as depicted in FIG. 3B, in a schematic section taken along line B-B of FIG. 3A, to provide the chemicals for injection to the atomized nozzle 40 in the flow of the flue gas. As shown in FIG. 3A, the internal channel 52 supplies the liquid alkali 70 or alkaline sorbent 72 or mixture of alkali or alkaline sorbent 74 with liquid ammonia 78 and water 84 to the inner shell 60 from where the atomized nozzle 40, which is attached to the inner shell 60, inject the same in the flue gas in either a square or conical spray pattern for controlling the SO₃ emissions, as well as reducing the NOx emissions at same time and at same location. The outer channels 54 supply cooling/dilution air 82 to the outer shell 80, having a plurality of pores 100 in a staggered arrangement, to provide the cooling/dilution air 82 into the flow of the flue gas. In this way, at the same time through the inner shell, the liquid injection in form of a mixture of ammonia or urea with an aqueous alkali 70 or alkaline sorbent 72 such as sodium carbonate, sodium bicarbonate or calcium hydroxide, is provided from the atomized nozzles 40, attached to the single dual injection grid 27, at the same time and same location into the flow of the flue gas to control the NOx and SO₃ emissions.

A controller 140 located on the separate skid (not shown) is provided to control the flow of the chemicals through the dual injection grid arrangement 27. The controlled dual injection grid arrangement 27 provides the chemicals at the same time and location to control the SO₃ emission and the NOx emission in the flue gas. The injection of the chemicals covers the full cross-sectional area of duct 21, eliminating the need for additional flue gas mixing devices, either upstream or downstream of the dual injection grid arrangement 27 location. The NOx reduction through the controller 140 is based on a feedforward process using a NOx signal provided by an analyzer 160 located upstream of the dual injection grid arrangement 27. By measuring the flue gas flow rate, inlet NOx concentration and the set molar ratio of ammonia to inlet NOx, the required ammonia flow is determined. In order to ensure that the NOx emission requirements are achieved at all operating loads, the controller 140 is further adjusted by a NOx trim signal provided by an analyzer 170 located downstream of a SCR reactor chamber 47. The outlet NOx measurement provides a feedback for trimming the ammonia flow control valve 180 which is located on the separate skid (not shown).

The mixture of alkali or alkaline sorbent for the SO₃ mitigation is also controlled by a separate controller 142, through an inlet SO₃ analyzer 190 upstream of the dual injection grid arrangement 27. Similar to the NOx control system, a signal is provided by the SO₃ analyzer 190 to a feed pump (not shown) and corresponding flow control valve 200 that regulates the flow of the mixture of alkali or alkaline sorbent 74 to the injection tube 30. The mixture of alkali or alkaline sorbent 74 streams is sprayed into the flue gas through individual atomized nozzles 40 located in the duct 21. An analyzer 210, located downstream of an air preheater 34, will act as a trim on the controller 142 to ensure that the SO₃ emission requirements are met. The controller 142, the ammonia control valve 180, the SO₃ control valve 200 are placed on the skid (not shown) located near the dual injection grid 27.

In a method for reducing pollutants in the flue gas from the furnace/boiler 10, the chemicals are supplied to the dual injection grid arrangement 27. The chemicals are injected in the flue gas in either a square or conical spray pattern through the atomized nozzle 40. The supplied chemicals include the mixture of ammonia or urea with an aqueous alkali or alkaline sorbent to the inner shell 60 and the outer shell 80 of the injection tube 30. The injection of the chemicals includes the injecting the liquid alkali or alkaline based sorbent, with or without liquid ammonia 78 and water 84 into the flue gas, through the atomized nozzle 40, which is attached to the inner shell 60. Further injecting the gaseous ammonia 76 with cooling/dilution air 82 into the flue gas is done through, for example, in the form of the extension arm 42 and a nozzle cap 45, which is attached in the staggered arrangement to the outer shell 80.

A controller 140 is controlling the flow of the chemicals through the dual injection grid arrangement 27, providing the chemicals at the same time and location to control the NOx emissions in the flue gas and a separate controller 142 is controlling the flow of the chemicals through the dual injection grid arrangement 27, providing the chemicals at the same time and location to control the $SO_3$. The injection of chemicals covering the full cross-sectional area of a duct 2, eliminates the need for additional flue gas mixing devices, either upstream or downstream of the injection grid arrangement 27 location.

The foregoing descriptions of specific embodiments of the present disclosure have been presented for purposes of illustration and description. They are not intended to be exhaustive or to limit the present disclosure to the precise forms disclosed. Many modifications and variations are possible in light of the above examples. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest, or render expedient, but such are intended to cover the application or implementation without departing from the spirit or scope of the claims of the present disclosure.

The invention claimed is:

1. A method of reducing pollutants in the flue gas from a furnace, comprising the steps of:
    arranging a dual injection grid with at least one injection tube in fluid communication with a flow of the flue gas, the injection tube comprising an inner shell surrounded by an outer shell, the inner shell having at least one nozzle, the outer shell having at least one aperture;
    providing a first chemical to the inner shell;
    providing a second chemical to the outer shell;
    injecting the first chemical into the flue gas through the at least one nozzle;
    injecting the second chemical into the flue gas through the at least one aperture; and wherein at least one of the first and second chemicals is a mixture of ammonia or urea with an aqueous alkali or alkaline sorbent.

2. The method of claim 1, wherein at least one nozzle injects the first chemical into the flue gas in a spray pattern.

3. The method of claim 1, wherein the first chemical is a mixture of a liquid/gas phase or a liquid/liquid phase or a gas/gas phase.

4. The method of claim 1, wherein at least one extension arm with at least one nozzle cap is coupled to the outer shell to inject gaseous ammonia diluted with air into the flue gas.

5. The method of claim 1, wherein the at least one aperture defines a plurality of nozzles or pores formed in a staggered arrangement on the outer shell.

6. The method of claim 1, wherein the providing of the first and second chemicals is done at the same time and location.

7. The method of claim 1, wherein at least one of the first and second chemicals is a liquid alkali or alkaline based sorbent with or without ammonia and water.

8. The method of claim 1, wherein the injecting of the second chemical includes the injecting of gaseous ammonia with dilution air into the flue gas through at least one extension arm with at least one nozzle cap.

9. The method of claim 1, further comprising:
    controlling a flow of the first chemical through the dual injection grid arrangement with a first controller; and
    controlling a flow of the second chemical with a second controller.

10. The method of claim 1, wherein
    the injecting of the first and second chemicals covers the full cross-sectional area of a duct.

11. The method of claim 1 wherein the at least one injection tube is extends generally transverse or axial to a flow of the flue gas.

12. The method of claim 1 wherein said at least one aperture comprises at least one second nozzle.

\* \* \* \* \*